United States Patent
Ito et al.

(10) Patent No.: US 10,413,996 B2
(45) Date of Patent: Sep. 17, 2019

(54) LASER PROCESSING MACHINE

(71) Applicant: AMADA HOLDINGS CO., LTD., Kanagawa (JP)

(72) Inventors: Ryohei Ito, Kanagawa (JP); Hiroaki Ishiguro, Kanagawa (JP)

(73) Assignee: AMADA HOLDINGS CO., LTD., Kanagawa (JP)

(*) Notice: Subject to any disclaimer, the term of this patent is extended or adjusted under 35 U.S.C. 154(b) by 0 days.

(21) Appl. No.: 16/060,160

(22) PCT Filed: Dec. 5, 2016

(86) PCT No.: PCT/JP2016/086083
§ 371 (c)(1),
(2) Date: Jun. 7, 2018

(87) PCT Pub. No.: WO2017/099038
PCT Pub. Date: Jun. 15, 2017

(65) Prior Publication Data
US 2018/0361503 A1    Dec. 20, 2018

(30) Foreign Application Priority Data

Dec. 8, 2015 (JP) ................. 2015-239209

(51) Int. Cl.
*B23K 26/00* (2014.01)
*B23K 26/064* (2014.01)
(Continued)

(52) U.S. Cl.
CPC .......... *B23K 26/0648* (2013.01); *B23K 26/00* (2013.01); *B23K 26/0006* (2013.01);
(Continued)

(58) Field of Classification Search
CPC .. B23K 26/0648; B23K 26/38; B23K 26/073; B23K 26/0006; B23K 26/062;
(Continued)

(56) References Cited

U.S. PATENT DOCUMENTS

2010/0174273 A1    7/2010    Murakami

FOREIGN PATENT DOCUMENTS

| DE | 10 2011 117 607 | 5/2013 |
|----|-----------------|--------|
| JP | 3-189090 | 8/1991 |
| JP | 5-38593 | 2/1993 |
| JP | 2010-158331 | 7/2010 |
| JP | 2013-202675 | 10/2013 |

OTHER PUBLICATIONS

Japanese to English machine translation of JP 2013-202675.*
(Continued)

*Primary Examiner* — Michael G Hoang
(74) *Attorney, Agent, or Firm* — Greenblum & Bernstein, P.L.C.

(57) ABSTRACT

A laser processing machine includes a convex lens having a positive focal length, a concave lens having a negative focal length, and a focusing lens having a positive focal length. The convex lens is movable in an optical axis direction and converts divergent light of a laser beam emitted from a laser beam emission end into convergent light. The concave lens is movable in the optical axis direction and is disposed at a position that is shifted from a position where the convergent light is focused toward the convex lens side by the same distance as the focal length of the concave lens according to a position of the convex lens in the optical axis direction. The concave lens converts the convergent light into parallel light. The focusing lens focuses the laser beam emitted from the concave lens and irradiates a plate material with the focused laser beam.

7 Claims, 6 Drawing Sheets

(51) Int. Cl.
 *B23K 26/073* (2006.01)
 *G02B 27/09* (2006.01)
 *B23K 26/38* (2014.01)
 *B23K 26/06* (2014.01)

(52) U.S. Cl.
 CPC .......... *B23K 26/064* (2015.10); *B23K 26/073* (2013.01); *B23K 26/38* (2013.01); *G02B 27/09* (2013.01)

(58) Field of Classification Search
 CPC .... B23K 26/0665; B23K 26/00; B23K 26/06; G02B 27/0983; G02B 27/0977; G02B 27/09; G02B 27/0961; G02B 27/0966; G02B 27/095
 USPC .... 219/121.67, 121.72–75, 121.85; 359/362, 359/366, 372, 379, 380, 403, 419
 See application file for complete search history.

(56) References Cited

OTHER PUBLICATIONS

Official Communication issued in WIPO International Patent Application No. PCT/JP2016/086083, dated Jan. 10, 2017, along with an English translation thereof.

Official Action issued in Japan Counterpart Patent Appl. No. 2015-239209, dated Aug. 1, 2017, along with an English translation thereof.

Official Action issued in Japan Counterpart Patent Appl. No. 2015-239209, dated Jul. 3, 2017, along with an English translation thereof.

Official Action issued in Japan Counterpart Patent Appl. No. 2015-239209, dated Dec. 21, 2016, along with an English translation thereof.

* cited by examiner (a)

(b)

(c)

1

LASER PROCESSING MACHINE

TECHNICAL FIELD

The present disclosure relates to a laser processing machine that cuts a plate material formed of metal using a laser beam.

BACKGROUND ART

A laser processing machine has been widely used that cuts a plate material formed of metal using a laser beam emitted from a laser oscillator. In the laser processing machine, various laser oscillators are used. In order to cut a plate material with a high speed having a relatively thin plate thickness, a fiber laser oscillator is frequently used, for example. The fiber laser oscillator not only has an advantage in that it is suitable for high-speed cutting of a plate material, but also has an advantage in that it has a smaller size and lower costs than a $CO_2$ laser oscillator.

CITATION LIST

Patent Literature

[Patent Literature 1]: German Patent Application Publication No. 10 2011 117 607 A1

SUMMARY OF THE INVENTION

Among plate materials having relatively thin plate thicknesses, a plate material having a plate thickness of 6 mm to 30 mm, for example, is called a "thick plate", and a plate material having a plate thickness of 0.1 mm to 6 mm, for example, is called a "thin plate". In the industry, a plate material having a plate thickness of 2 mm to 12 mm, for example, is also sometimes called a "medium thick plate". It is difficult to cut a thick plate and a thin plate using the same laser processing machine by changing the processing conditions. The processing conditions described herein include the power of a laser beam, a pulse duty cycle during the pulse oscillation of a laser beam, a focal position, and the type of assist gas or gas pressure, for example.

Therefore, in the conventional laser processing machine, in order to cut both a thick plate and a thin plate, it is necessary to replace a component of a laser processing machine such as an optical element such as a lens or the like, or a processing nozzle. The replacement of a component is complicated, which causes an increase in costs. Therefore, a laser processing machine is desired that can cut both a thick plate and a thin plate without replacing a component.

An object of an embodiment is to provide a laser processing machine that can cut a plate material having a plate thickness in a predetermined range without replacing a component.

An aspect of an embodiment provides a laser processing machine including: a first lens that is movable in an optical axis direction and having a positive focal length, and configured to convert divergent light of a laser beam emitted from an emission end of the laser beam into convergent light; a second lens that is movable in the optical axis direction and having a negative focal length on which the convergent light is incident; and a third lens having a positive focal length, configured to focus the laser beam emitted from the second lens, and to irradiate a plate material with the focused laser beam, wherein the second lens is disposed at a position, which is shifted from a position where the convergent light is focused toward the first lens side by the same distance as the focal length of the second lens according to a position of the first lens in the optical axis direction, and is configured to convert the convergent light into parallel light.

It is preferable that the laser processing machine further includes: a first moving mechanism for moving the first lens; a second moving mechanism for moving the second lens; a first driver configured to drive the first moving mechanism; a second driver configured to drive the second moving mechanism; and a controller configured to control the first and second drivers so as to move the first and second lenses, respectively, according to a processing condition of the plate material.

At this time, the controller controls the first and second drivers to increase a beam diameter of the laser beam incident on the third lens so as to decrease a focused beam diameter as a plate thickness of the plate material is thinner, and to decrease the beam diameter of the laser beam incident on the third lens so as to increase the focused beam diameter as a plate thickness of the plate material is thicker. Even when the first and second drivers move the first lens and the second lens, respectively, a focal position of the laser beam emitted from the third lens and focused on the plate material is fixed.

In the laser processing machine, it is preferable that the third lens is configured to be movable in the optical axis direction, and to change a focal position of the laser beam.

It is preferable that the laser processing machine further includes: a first moving mechanism for moving the first lens; a second moving mechanism for moving the second lens; a third moving mechanism for moving the third lens; a first driver configured to drive the first moving mechanism; a second driver configured to drive the second moving mechanism; a third driver configured to drive the third moving mechanism; and a controller configured to control the first driver, the second driver, and the third driver so as to move the first lens, the second lens, and the third lens, respectively, according to a processing condition of the plate material.

In accordance with the laser processing machine according to an embodiment, a plate material having a plate thickness in a predetermined range can be cut without replacing a component.

MODES FOR CARRYING OUT THE INVENTION

Figure 1:
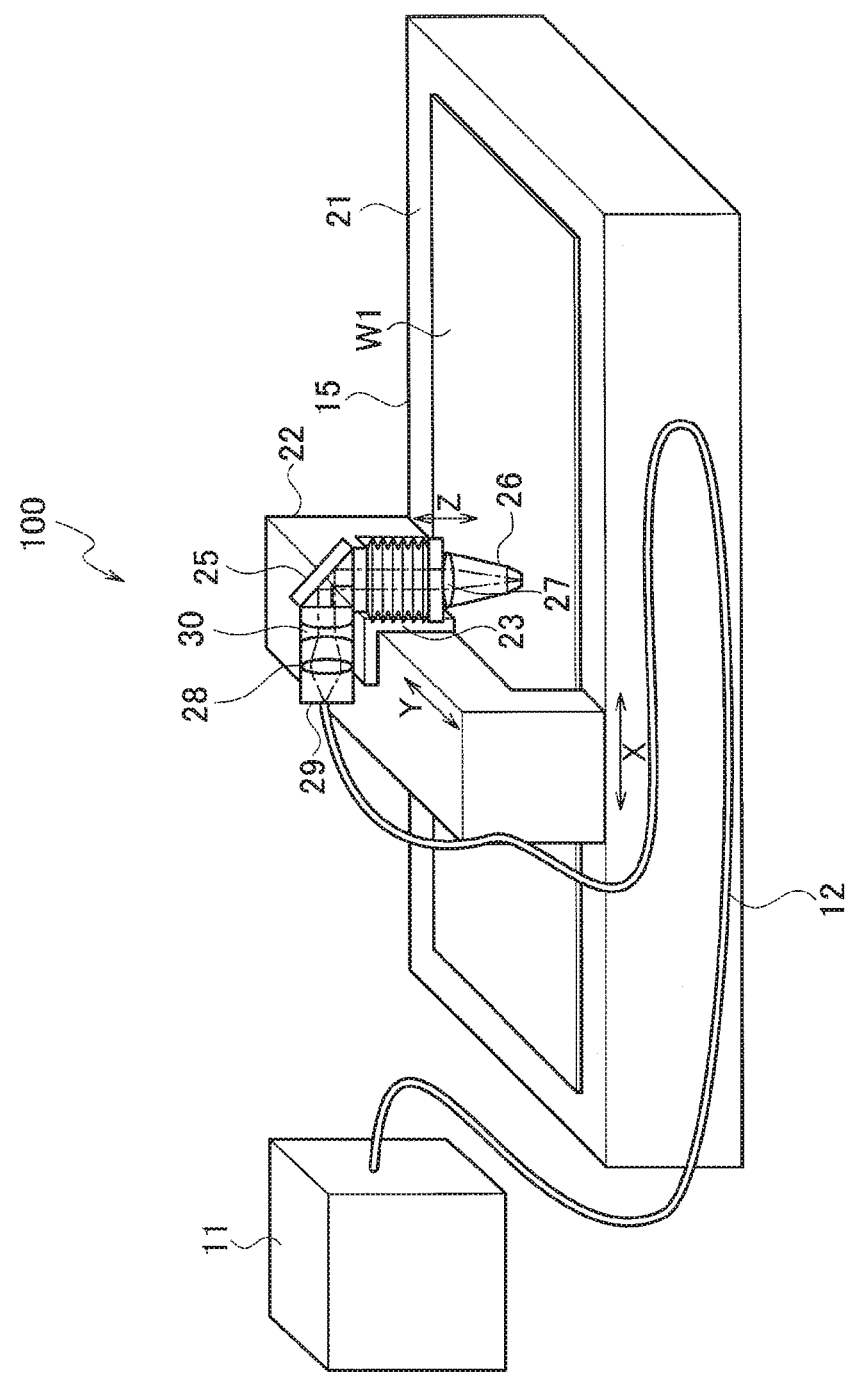
FIG. 1 is a perspective view illustrating an overall configuration example of a laser processing machine according to an embodiment.

Hereinafter, a laser processing machine according to an embodiment will be described with reference to the accompanying drawings. In FIG. 1, a laser processing machine 100 includes: a laser oscillator 11 that generates and emits a laser beam; a laser processing unit 15; and a process fiber 12 that transmits the laser beam to the laser processing unit 15. The laser processing machine 100 cuts a plate material W1 formed of metal using the laser beam emitted from the laser oscillator 11.

As the laser oscillator 11, a laser oscillator is preferable that amplifies an excitation beam emitted from a laser diode to emit a laser beam having a predetermined wavelength, or a laser oscillator that directly uses a laser beam emitted from a laser diode. Examples of the laser oscillator 11 include a solid laser oscillator, a fiber laser oscillator, a disk laser oscillator, and a direct diode laser oscillator (DDL oscillator).

The process fiber 12 is mounted along cable ducts (not illustrated) of an X-axis and a Y-axis disposed in the laser processing unit 15.

The laser processing unit 15 includes: a processing table 21 on which the plate material W1 is placed; a gate-type X-axis carriage 22 that is movable on the processing table 21 in an X-axis direction; and a Y-axis carriage 23 that is movable on the X-axis carriage 22 in a Y-axis direction perpendicular to the X-axis. In addition, the laser processing unit 15 includes a collimator unit 29 that is fixed to the Y-axis carriage 23.

The collimator unit 29 includes: a convex lens 28 on which a laser beam emitted from the emission end of the process fiber 12 is incident; and a concave lens 30 on which the laser beam emitted from the convex lens 28 is incident. In addition, the collimator unit 29 includes: a bend mirror 25 that reflects the laser beam emitted from the concave lens 30 downward in a Z-axis direction perpendicular to the X-axis and the Y-axis; a focusing lens 27 that focuses the laser beam reflected from the bend mirror 25; and a processing head 26.

The convex lens 28 is a lens having a positive focal length, the concave lens 30 is a lens having a negative focal length, and the focusing lens 27 is a lens having a positive focal length. The focusing lens 27 is a convex lens. The convex lens 28 and the concave lens 30 function as collimating lenses that collimate each of the incident laser beams. As described below, the convex lens 28, the concave lens 30, and the focusing lens 27 are configured to be movable in an optical axis direction.

The convex lens 28, the concave lens 30, the bend mirror 25, the focusing lens 27, and the processing head 26 are disposed in the collimator unit 29 in a state where an optical axis is adjusted in advance.

The collimator unit 29 is fixed to the Y-axis carriage 23 that is movable in the Y-axis direction, and the Y-axis carriage 23 is provided in the X-axis carriage 22 that is movable in the X-axis direction. Accordingly, the laser processing unit 15 can move the position, where the plate material W1 is irradiated with the laser beam emitted from the processing head 26, in the X-axis direction and the Y-axis direction.

With the above-described configuration, the laser processing machine 100 can transmit the laser beam emitted from the laser oscillator 11 to the laser processing unit 15 using the process fiber 12, and can irradiate the plate material W1 with the laser beam focused by the focusing lens 27 to cut the plate material W1.

When the plate material W1 is cut, assist gas is blown to the plate material W1 to remove molten material therefrom. FIG. 1 does not illustrate a configuration of blowing the assist gas.

Figure 2:
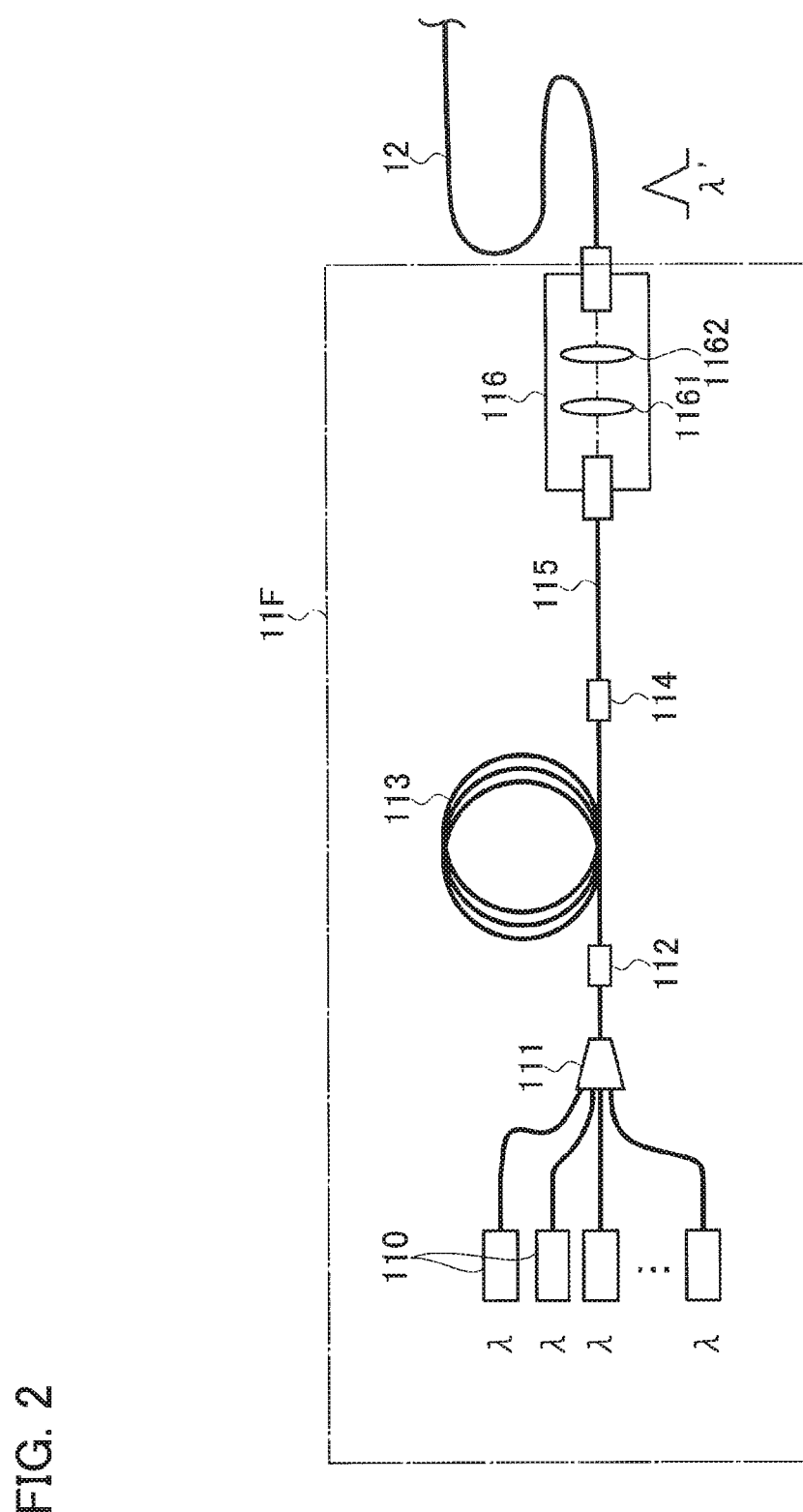
FIG. 2 is a diagram illustrating a schematic configuration in which a laser oscillator 11 illustrated in FIG. 1 is configured as a fiber laser oscillator 11F.

FIG. 2 illustrates a schematic configuration in which the laser oscillator 11 is configured as a fiber laser oscillator 11F. In FIG. 2, each of the plurality of laser diodes 110 emits a laser beam having a wavelength $\lambda$. An excitation combiner 111 spatially combines laser beams emitted from the laser diodes 110.

The laser beam emitted from the excitation combiner 111 is incident on a Yb-doped fiber 113 between two Fiber Bragg Gratings (FBGs) 112 and 114. The Yb-doped fiber 113 is a fiber in which Yb (ytterbium), as a rare earth element, is added to the core.

The laser beam incident on the Yb-doped fiber 113 repeatedly reciprocates between the FBGs 112 and 114, and a laser beam having a wavelength $\lambda'$ of about 1060 nm to 1080 nm (1 μm band), which is different from the wavelength $\lambda$, is emitted from the FBG 114. The laser beam emitted from the FBG 114 is incident on the process fiber 12 through a feeding fiber 115 and a beam coupler 116. The beam coupler 116 includes lenses 1161 and 1162.

Figure 3:
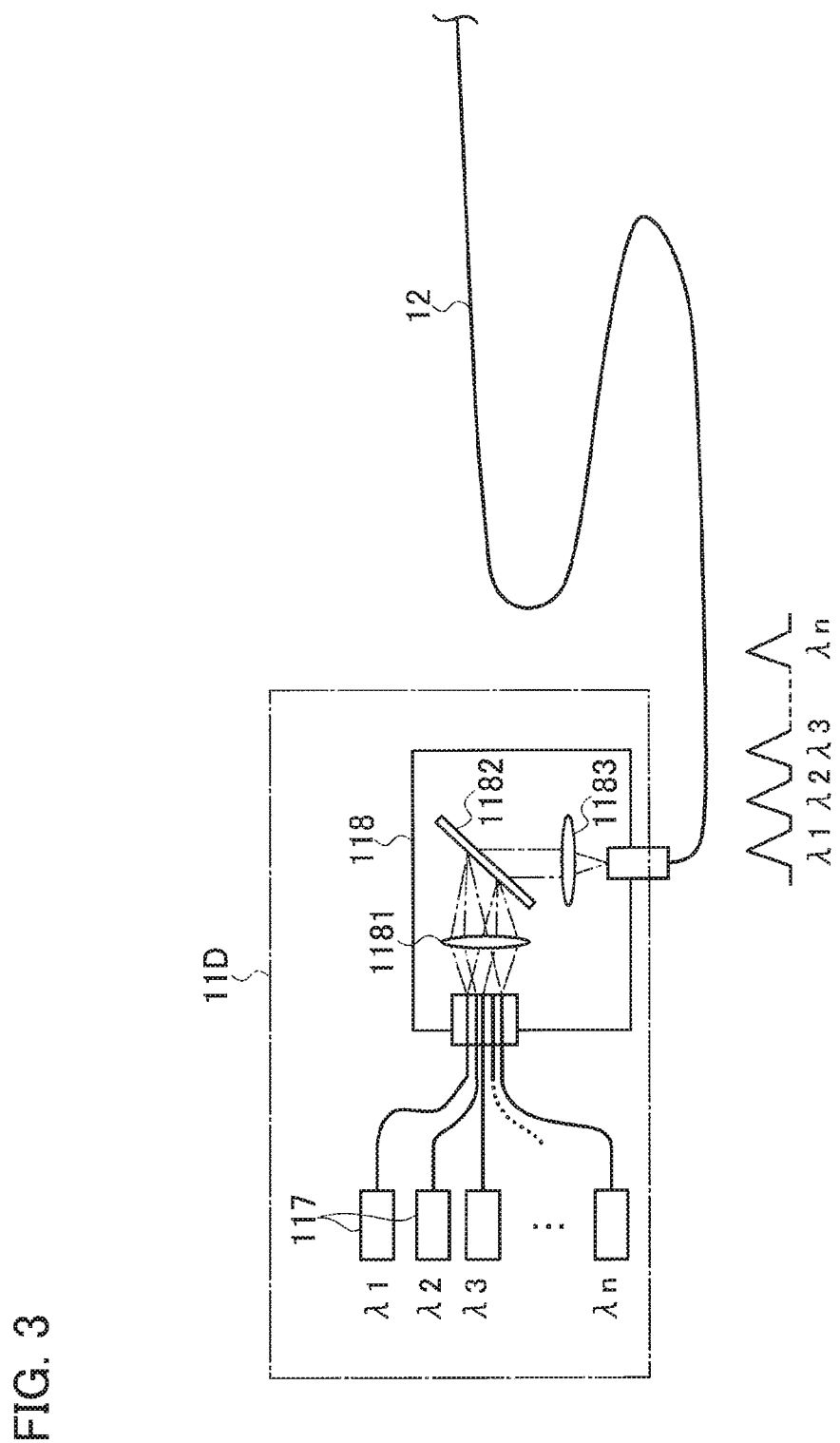
FIG. 3 is a diagram illustrating a schematic configuration in which the laser oscillator 11 illustrated in FIG. 1 is configured as a direct diode laser oscillator 11D.

FIG. 3 illustrates a schematic configuration in which the laser oscillator 11 is configured as a DDL oscillator 11D. In FIG. 3, a plurality of laser diodes 117 emit laser beams having different wavelengths $\lambda 1$ to $\lambda n$. The wavelengths $\lambda 1$ to $\lambda n$ (wavelength range of shorter than 1 μm band) are in a range of 910 nm to 950 nm, for example.

An optical box 118 spatially combines the laser beams having the wavelengths $\lambda 1$ to $\lambda n$ emitted from the laser diodes 117. The optical box 118 includes a collimating lens 1181, a grating 1182, and a focusing lens 1183.

The collimating lens 1181 collimates the laser beams having the wavelengths $\lambda 1$ to $\lambda n$. The grating 1182 bends directions of the collimated laser beams by 90 degrees and allows the collimated laser beams to be incident on the focusing lens 1183. The focusing lens 1183 focuses the incident laser beams and allows the laser beams to be incident on the process fiber 12.

Figure 4:
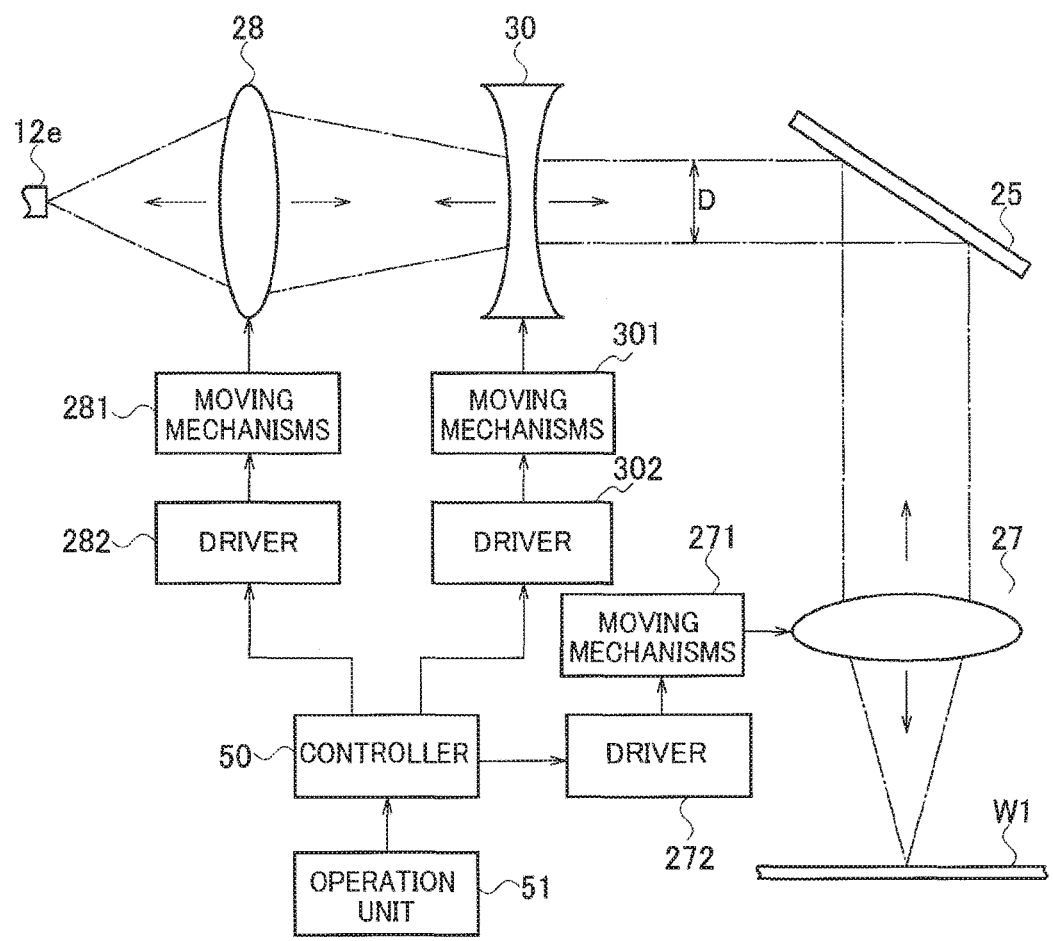
FIG. 4 is a diagram illustrating a schematic configuration example in which a convex lens 28, a concave lens 30, and a focusing lens 27 illustrated in FIG. 1 are movable.

A schematic configuration example in which the convex lens 28, the concave lens 30, and the focusing lens 27 are movable will be described using FIG. 4. In FIG. 4, the convex lens 28 and the concave lens 30 are respectively attached to moving mechanisms 281 and 301 for allowing the convex lens 28 and the concave lens 30 to be movable in the optical axis direction (the X-axis direction in FIG. 1). The focusing lens 27 is attached to a moving mechanism 271 for allowing the focusing lens 27 to be movable in the optical axis direction (the Z-axis direction in FIG. 1).

The moving mechanisms 281, 301, and 271 may be any mechanism as long as each of the convex lens 28, the concave lens 30, and the condenser lens 27 is movable using any one of a gear, a belt, a rack and pinion, a worm gear, a ball screw, and the like (or an arbitrary combination thereof), for example.

The convex lens 28, the concave lens 30, and the focusing lens 27 move in the direction of the optical axis as indicated by the arrows, in such a way that the drivers 282, 302, and 272 drive the moving mechanisms 281, 301, and 271, respectively. The drivers 282, 302, and 272 are motors, for examples.

A controller 50 controls the drivers 282, 302, and 272. The controller 50 can be constituted by a microprocessor. The controller 50 may be an NC device that controls the entire portion of the laser processing machine 100.

An operator can set various processing conditions such as the kind of material of the plate material W1, the plate thickness of the plate material W1, a focused beam diameter of a laser beam, or a focal position by operating an operation unit 51. Examples of the material of the plate material W1 include iron, stainless steel, aluminum, copper, and brass. The plate thickness of the plate material W1 is a value in a predetermined range of 0.1 mm to 30 mm, for example.

The controller 50 controls the driving of the moving mechanisms 281 and 301 by the drivers 282 and 302, so as to adjust the positions of the convex lens 28 and the concave lens 30 according to the processing condition of the plate material W1 input by the operation unit 51.

In a case where the focused beam diameter of the laser beam is input by the operation unit 51, the controller 50 controls the drivers 282 and 302, so as to adjust the positions of the convex lens 28 and the concave lens 30 according to the input focused beam diameter.

Even when the focused beam diameter of the laser beam is not input, as long as the kind of material of the plate material W1 and the plate thickness are input, an optimum focused beam diameter is substantially determined. In a case where the kind of material of the plate material W1 and the plate thickness are input by the operation unit 51, the controller 50 can control the drivers 282 and 302 so as to adjust the positions of the convex lens 28 and the concave lens 30 according to a focused beam diameter corresponding to the kind of the input material and the input plate thickness.

The controller 50 may obtain a necessary focused beam diameter by calculation based on the processing conditions, or may read a pre-stored focused beam diameter corresponding to each of the processing conditions.

In a case where the focal position is input by the operation unit 51, the controller 50 controls the driving of the moving mechanisms 271 by the driver 272, so as to adjust the position of the focusing lens 27 according to the input focal position.

In FIG. 4, a laser beam is emitted from an emission end 12e of the process fiber 12 as divergent light as indicated by an alternate long and short dashed line. In a case where the laser beam emitted from the laser oscillator 11 is directly incident on the collimator unit 29, the position of the emission end 12e is the position of an emission end of the laser oscillator 11.

The convex lens 28 is disposed in such a way the distance from the emission end 12e to the convex lens 28 is equal to or greater than the focal length of the convex lens 28. Accordingly, the convex lens 28 converts the divergent light of the laser beam into convergent light. The controller 50 can move the convex lens 28 in the optical axis direction under the condition that the distance from the emission end 12e to the convex lens 28 is equal to or than the focal length of the convex lens 28.

In a case where the concave lens 30 is disposed at an optimum position described below, the concave lens 30 converts the convergent light into parallel light. The parallel light described herein represents that a laser beam flux is parallel light. The parallel light emitted from the concave lens 30 is reflected by the bend mirror 25 and the optical path is bent, and the reflected laser beam is incident on the focusing lens 27. The focusing lens 27 focuses the parallel light so that the focal position is on or near the surface of the plate material W1, and irradiates the plate material W1 with a focused laser beam.

Figure 5:
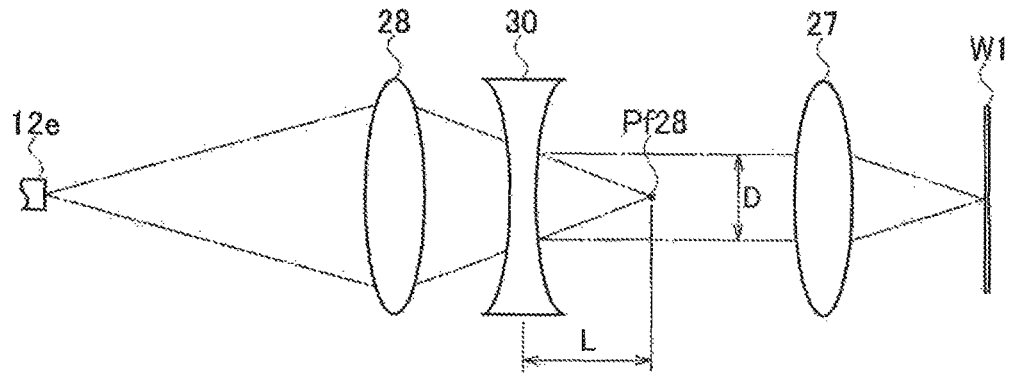
FIG. 5 is diagram illustrating a method of moving the convex lens 28, the concave lens 30, and the focusing lens 27.
Figure 5:
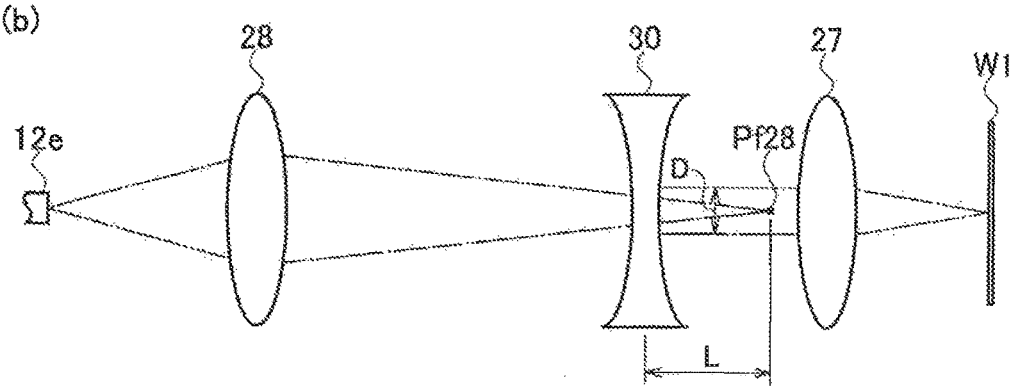
Figure 5:
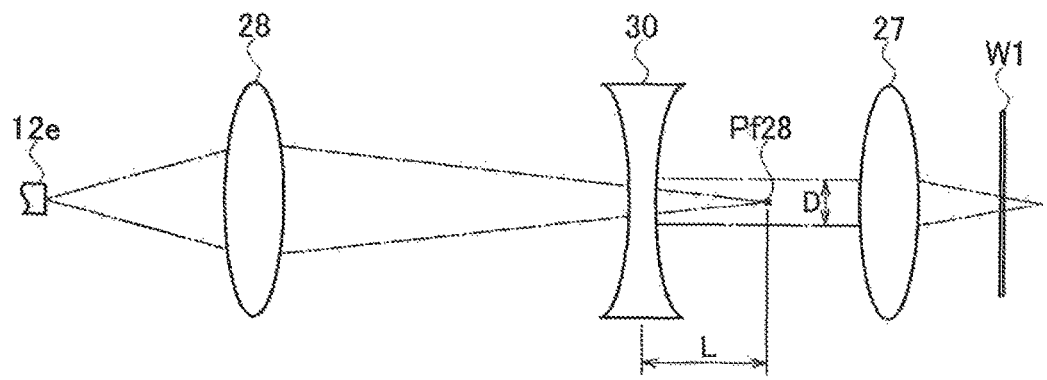

(a) to (c) of FIG. 5 schematically illustrates a state where the convex lens 28, the concave lens 30, and the focusing lens 27 are arranged so that the optical axis is in a straight line, omitting the bend mirror 25 in FIG. 4. In (a) to (c) of FIG. 5, it is assumed that the concave lens 30 is not present, and a position where the convergent light emitted from the convex lens 28 is focused is a point Pf28. In a case where the concave lens 30 is positioned at the position that is shifted from the point Pf28 toward the convex lens 28 side by the same distance L as the focal length of the concave lens 30, the concave lens 30 converts the convergent light into parallel light.

As illustrated in (a) and (b) of FIG. 5, a beam diameter D of the parallel light emitted from the concave lens 30 varies depending on a convergence angle of the convergent light emitted from the convex lens 28.

Figure 6:
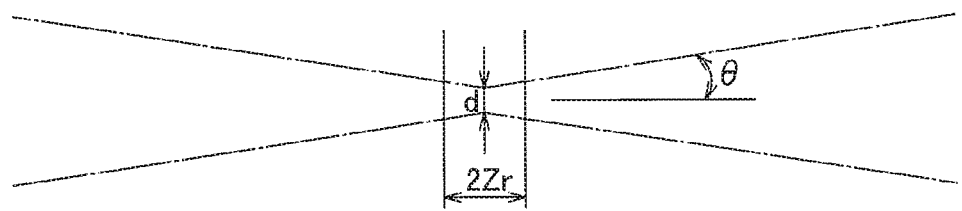
FIG. 6 is a diagram illustrating a focused beam diameter and a divergence angle of a laser beam.

FIG. 6 is an enlarged view schematically illustrating the periphery of the beam waist of the laser beam focused on or near the surface of the plate material W1. In FIG. 6, the left side is the upper side of the plate material W1, and the right side is the lower side of the plate material W1.

A focused beam diameter d is represented by Equation (1). A Rayleigh length Zr is represented by Equation (2). In Equations (1) and (2), BPP represents a beam parameter product that is a product of a radius d/2 of the beam waist and a half width at half maximum θ of a divergence angle of the beam, and f represents a focal length of the focusing lens 27.

$$d = \frac{4 \cdot BPP \cdot f}{D} \qquad (1)$$

$$Zr = \frac{4 \cdot BPP \cdot f^2}{D^2} \qquad (2)$$

BPP does not change even when the convex lens 28 and the concave lens 30 are moved, or when the focusing lens 27 is moved. Accordingly, based on Equations (1) and (2), the focused beam diameter d and the Rayleigh length Zr are determined according to the beam diameter D, and when the beam diameter D changes, the focused beam diameter d and the Rayleigh length Zr change.

As the beam diameter D increases, the focused beam diameter d and the Rayleigh length Zr decrease, the power density increases, and a beam profile suitable for a thin plate is obtained. As the beam diameter D decreases, the focused beam diameter d and the Rayleigh length Zr increase, the power density decreases, and a beam profile suitable for a thick plate is obtained.

The controller 50 calculates the beam diameter D corresponding to the target focused beam diameter d based on the Equation (1), and controls the drivers 282 and 302 to move the convex lens 28 and the concave lens 30, in such a way that the convex lens 28 and the concave lens 30 are positioned at positions where the calculated beam diameter D is realized.

Specifically, the controller 50 causes the convex lens 28 to be moved in such a way that the convergence angle of the laser beam emitted from the convex lens 28 matches the convergence angle at which the target beam diameter D is obtained. In addition to this, the controller 50 causes the concave lens 30 to be moved to the position shifted from the point Pf28 toward the convex lens 28 side by the distance L, in such a way that the concave lens 30 converts the convergent light into parallel light according to the position of the convex lens 28 in the optical axis direction.

The controller 50 calculates positions of the convex lens 28 and the concave lens 30 at which the target beam diameter D and the target focused beam diameter d are obtained, and cause the convex lens 28 and the concave lens 30 to be moved to the calculated positions.

As can be seen from (a) and (b) of FIG. 5, since the focusing lens 27 focuses the parallel light, the focal position of the laser beam does not change even when the position of the concave lens 30 changes.

As described above, the controller 50 controls the drivers 282 and 302 in such a way that the beam diameter D of the laser beam incident on the focusing lens 27 is increased so as to decrease the focused beam diameter d as the plate thickness of the plate material W1 decreases, and that the beam diameter D of the laser beam incident on the focusing lens 27 is decreased so as to increase the focused beam diameter d as the plate thickness of the plate material W1 increases. Even when the drivers 282 and 302 move the convex lens 28 and the concave lens 30, respectively, the focal position of the laser beam emitted from the focusing lens 27 and focused on the plate material W1 is fixed and does not change.

Note that the beam intensity distribution in the beam diameter D is formed by reflection synthesis of a laser beam transmitted to the core and the cladding of the process fiber 12. As illustrated in (a) and (b) of FIG. 5, even when the beam diameter D changes, the beam intensity distribution hardly changes; even when the beam intensity distribution in the beam diameter D changes, this change is extremely small.

As illustrated in (c) of FIG. 5, when the controller 50 causes the focusing lens 27 to be moved, the focal position can be changed. Instead of setting the surface of the plate material W1 as the focal position, a position slightly shifted from the surface or the back of the plate material W1 may be set as the focal position for cutting.

In a case where the focal position is input by the operation unit 51, the controller 50 control the driver 272 to move the focusing lens 27 so that the focal position matches the input focal position; even when the focusing lens 27 is moved to change the focal position, the focused beam diameter d does not change.

As described above, in accordance with the laser processing machine 100 according to an embodiment, the focused beam diameter d and the focal position can be independently adjusted each other. In a case where it is not necessary to change the focal position, the position of the focusing lens 27 may be fixed, and only the convex lens 28 and the concave lens 30 may be configured to be movable.

The controller 50 may continuously adjust the focused beam diameter d according to the plate thickness of the plate material W1, or may adjust the focused beam diameter d in two steps by dividing the plate thickness into a thick plate having a plate thickness of 6 mm to 30 mm and a thin plate having a plate thickness of 0.1 mm to 6 mm, for example. Furthermore, the controller 50 may adjust the focused beam diameter d in three steps by dividing the plate thickness of the plate material into a thick plate having a plate thickness of 12 mm to 30 mm, a medium thick plate having a plate thickness of 2 mm to 12 mm, and a thin plate having a plate thickness of 0.1 mm to 2 mm. The controller 50 may adjust the focused beam diameter d in four or more steps by dividing the plate thickness of the plate material W1 into four or more groups.

In accordance with the laser processing machine 100 according to an embodiment, since the focused beam diameter d can be adjusted, the plate material W1 having a plate thickness in a predetermined range can be appropriately cut according to each plate thickness without replacing a component such as a lens or the like.

In accordance with the laser processing machine 100 according to an embodiment, it is sufficient that three lenses including the first lens (convex lens 28) having a positive focal length, the second lens (concave lens 30) having a negative focal length, and the third lens (focusing lens 27) having a positive focal length are provided. Accordingly, the configuration can be made to be simpler than the configuration described in Patent Literature 1, and a laser processing machine that can cut a plate material having a plate thickness in a predetermined range without replacing a component can be realized at a low cost.

In accordance with the laser processing machine 100 according to an embodiment, an appropriate cutting for the plate thickness can be realized, by configuring at least the first and second lenses so as to be freely movable.

The present invention is not limited to the above-described embodiment, and various modifications can be made without departing from the scope of the present invention.

INDUSTRIAL APPLICABILITY

The present invention can be used for cutting plate materials having a plurality of plate thicknesses using a laser beam.

What is claimed is:

1. A laser processing machine comprising:
a first lens that is movable in an optical axis direction and having a positive focal length, and configured to convert divergent light of a laser beam emitted from an emission end of the laser beam into convergent light;
a second lens that is movable in the optical axis direction and having a negative focal length, and on which the convergent light is incident, the second lens being configured to convert the convergent light emitted from the first lens into parallel light; and
a third lens having a positive focal length, configured to focus the parallel light emitted from the second lens into a focused laser beam, and to irradiate a plate material with the focused laser beam, wherein
the second lens is disposed at a position, which is shifted from a position where the convergent light is focused toward the first lens by a distance equal to the negative focal length of the second lens according to a position of the first lens in the optical axis direction,
the first lens is disposed in such a way that a distance from the emission end to the first lens is equal to or greater than the positive focal length of the first lens, and when a focused beam diameter that is a diameter of a beam waist of the focused laser beam irradiated on the plate material is represented by d, a beam parameter product that is a product of a radius d/2 of the beam waist and a half width at half maximum of a divergence angle of the focused laser beam irradiated on the plate material is configured not to be changed and to be a fixed value, even when the first and second lenses are moved,
when a beam diameter of the parallel light emitted from the second lens is represented by D, the beam parameter product is represented by BPP, and the positive focal length of the third lens is represented by f, relative positions of the first and second lenses are set in such a way that the beam diameter D is increased so as to decrease the focused beam diameter d as a plate thickness of the plate material decreases, and that the beam diameter D is decreased so as to increase the focused beam diameter d as the plate thickness of the plate material increases, and
the focused beam diameter d is determined based on Equation (1)

$$d = \frac{4 \cdot BPP \cdot f}{D}. \quad (1)$$

2. The laser processing machine according to claim 1, wherein
when a Rayleigh length of the focused laser beam irradiated on the plate material is represented by Zr, the Rayleigh length Zr is determined based on Equation (2)

$$Zr = \frac{4 \cdot BPP \cdot f^2}{D^2}. \qquad (2)$$

3. The laser processing machine according to claim 1, further comprising:
a first driver configured to move the first lens in the optical axis direction;
a second driver configured to move the second lens in the optical axis direction; and
a controller configured to control the first and second drivers so as to move the first and second lenses, respectively, according to a processing condition of the plate material.

4. The laser processing machine according to claim 3, wherein
the controller controls the first and second drivers to increase the beam diameter D so as to decrease the focused beam diameter d as the plate thickness of the plate material decreases, and to decrease the beam diameter D so as to increase the focused beam diameter d as the plate thickness of the plate material increases, and even when the first and second drivers move the first lens and the second lens, respectively, a focal position of the focused laser beam emitted from the third lens and focused on the plate material is fixed.

5. The laser processing machine according to claim 1, wherein
the third lens is configured to be movable in the optical axis direction, and to change a focal position of the focused laser beam.

6. The laser processing machine according to claim 5, wherein
the beam parameter product is configured not to be changed and to be a fixed value, even when the third lens is moved.

7. The laser processing machine according to claim 5, further comprising:
a first driver configured to move the first lens in the optical axis direction;
a second driver configured to move the second lens in the optical axis direction;
a third driver configured to move the third lens in the optical axis direction; and
a controller configured to control the first driver, the second driver, and the third driver so as to move the first lens, the second lens, and the third lens, respectively, according to a processing condition of the plate material.

\* \* \* \* \*